United States Patent
Chameroy et al.

(10) Patent No.: US 10,244,883 B2
(45) Date of Patent: Apr. 2, 2019

(54) BAYONET-FITTING PRESSURE COOKER PROVIDED WITH GUIDE ELEMENTS

(71) Applicant: SEB S.A., Ecully (FR)

(72) Inventors: Eric Chameroy, Veronnes (FR); Eric Laurent Baraille, Fontaine-les-Dijon (FR); Eric Rhetat, Dijon (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 15/172,048

(22) Filed: Jun. 2, 2016

(65) Prior Publication Data

US 2016/0353915 A1    Dec. 8, 2016

(30) Foreign Application Priority Data

Jun. 2, 2015 (FR) ...................................... 15 55001

(51) Int. Cl.
*A47J 27/08* (2006.01)
*A47J 27/09* (2006.01)

(52) U.S. Cl.
CPC ....... *A47J 27/0806* (2013.01); *A47J 27/0815* (2013.01); *A47J 27/09* (2013.01); *A47J 27/0804* (2013.01)

(58) Field of Classification Search
CPC .............. A47J 27/0817; A47J 27/0806; A47J 27/0804; A47J 27/0808; A47J 27/0815
USPC ........... 99/337; 219/440, 431; 220/316, 315, 220/293
See application file for complete search history.

(56) References Cited

U.S. PATENT DOCUMENTS

| | | | |
|---|---|---|---|
| 2,583,085 A * | 1/1952 | Campbell | ............... B29C 33/48 220/260 |
| 2,600,703 A | 6/1952 | Strom | |
| 2,660,330 A | 11/1953 | Keller | |

(Continued)

FOREIGN PATENT DOCUMENTS

| | | |
|---|---|---|
| BR | 8601076 A | 10/1987 |
| CH | 571335 A5 | 1/1976 |

(Continued)

OTHER PUBLICATIONS

Search Report and Written Opinion issued by Institut National de la Propriété Industrielle, for French Patent Application No. 1552579, dated Feb. 2, 2016, 8 pages.

(Continued)

*Primary Examiner* — Reginald Alexander
(74) *Attorney, Agent, or Firm* — Loeb & Loeb LLP

(57) ABSTRACT

The invention provides a cooking utensil for cooking food under pressure having a vessel, a lid, and a bayonet-fitting locking system comprising first and second series of locking projections, said utensil includes a lid subassembly that includes said lid and a support attached in pivotable manner to said lid, said lid subassembly and said vessel being configured to be associated with each other in a first arrangement in which the lid overlies the vessel, and a second arrangement obtained by moving said lid subassembly downwards until said first series of projections are lower than said second series of projections, said support and said vessel being provided respectively with complementary first and second guide elements that are configured to co-operate mutually whenever said lid subassembly and said vessel are associated with each other in said first arrangement.

22 Claims, 7 Drawing Sheets

(56) References Cited

U.S. PATENT DOCUMENTS

| | | | | |
|---|---|---|---|---|
| 3,653,533 A | * | 4/1972 | Mortensen | A47J 27/0806 220/298 |
| 3,876,385 A | * | 4/1975 | Markus | B01J 3/03 220/316 |
| 5,768,976 A | * | 6/1998 | Suk | A47J 27/0804 220/293 |

FOREIGN PATENT DOCUMENTS

| | | |
|---|---|---|
| CH | 694356 A5 | 12/2004 |
| CN | 2389593 Y | 8/2000 |
| CN | 2469839 Y | 1/2002 |
| CN | 201624512 U | 11/2010 |
| CN | 203000535 U | 6/2013 |
| CN | 102349791 B | 4/2014 |
| EP | 2258243 A1 | 12/2010 |
| EP | 2732736 A1 | 5/2014 |
| FR | 2783687 A1 | 3/2000 |
| GB | 657982 A | 10/1951 |
| WO | 0143605 A1 | 6/2001 |
| WO | 2013039332 A2 | 3/2013 |

OTHER PUBLICATIONS

Search Report and Written Opinion issued by Institut National de la Propriété Industrielle, for French Patent Application No. 1554997, dated Mar. 31, 2016, 6 pages.

Search Report and Written Opinion issued by Institut National de la Propriété Industrielle, for French Patent Application No. 1555000, dated Mar. 22, 2016, 6 pages.

Search Report and Written Opinion issued by Institut National de la Propriété Industrielle, for French Patent Application No. 1555001, dated Mar. 22, 2016, 6 pages.

Search Report and Written Opinion issued by Institut National de la Propriété Industrielle, for French Patent Application No. 1554999, dated Mar. 22, 2016, 6 pages.

* cited by examiner

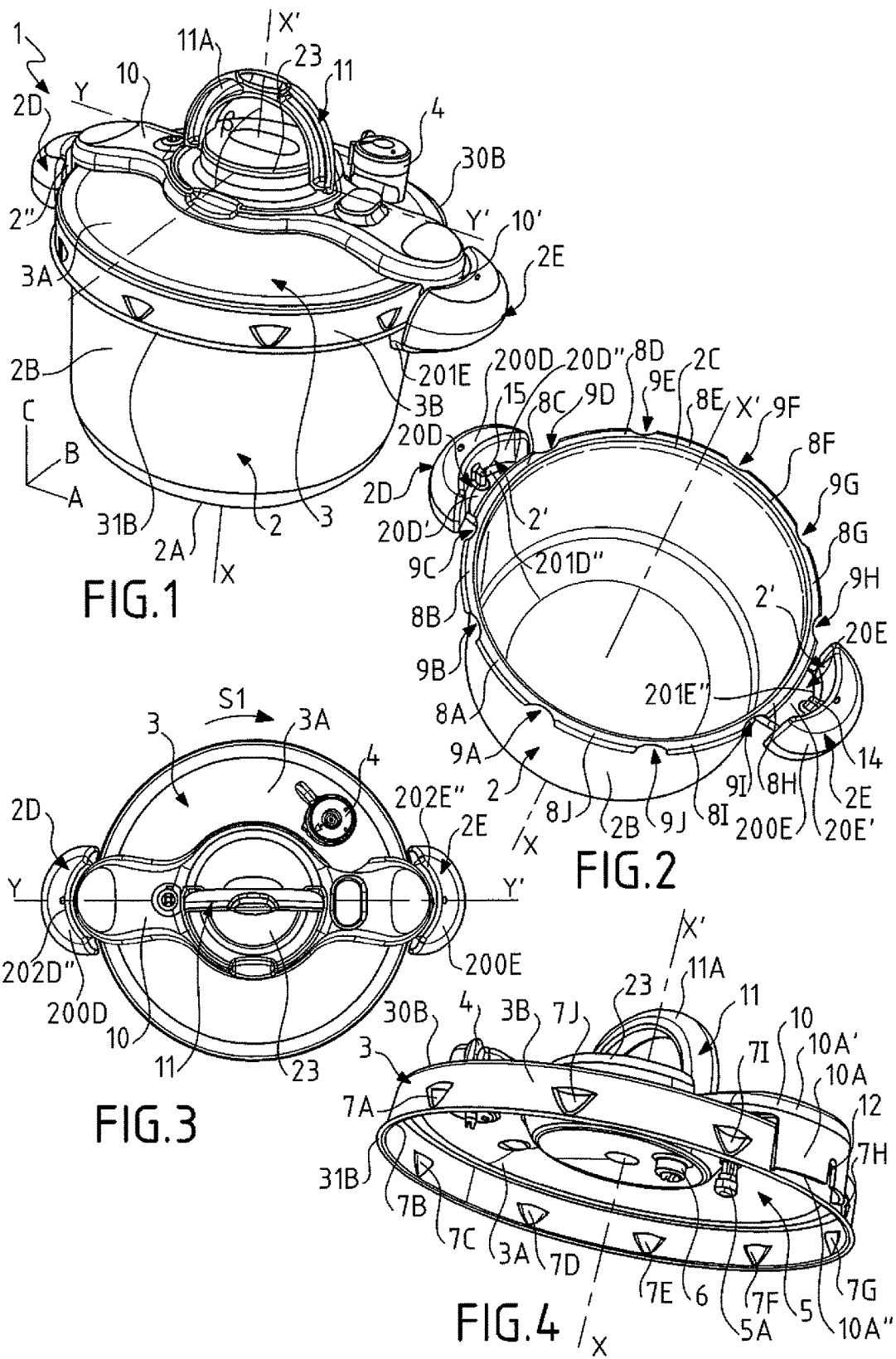

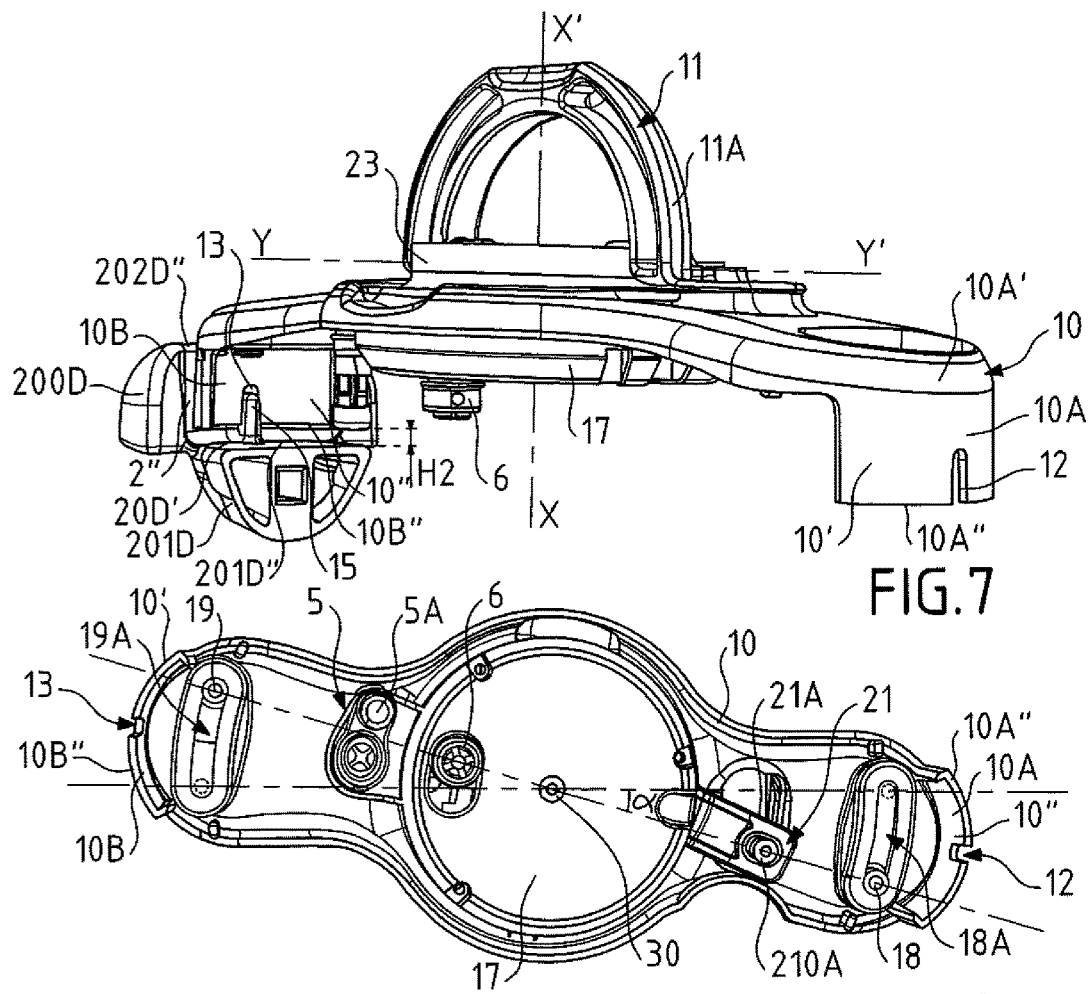
FIG.7
FIG.8
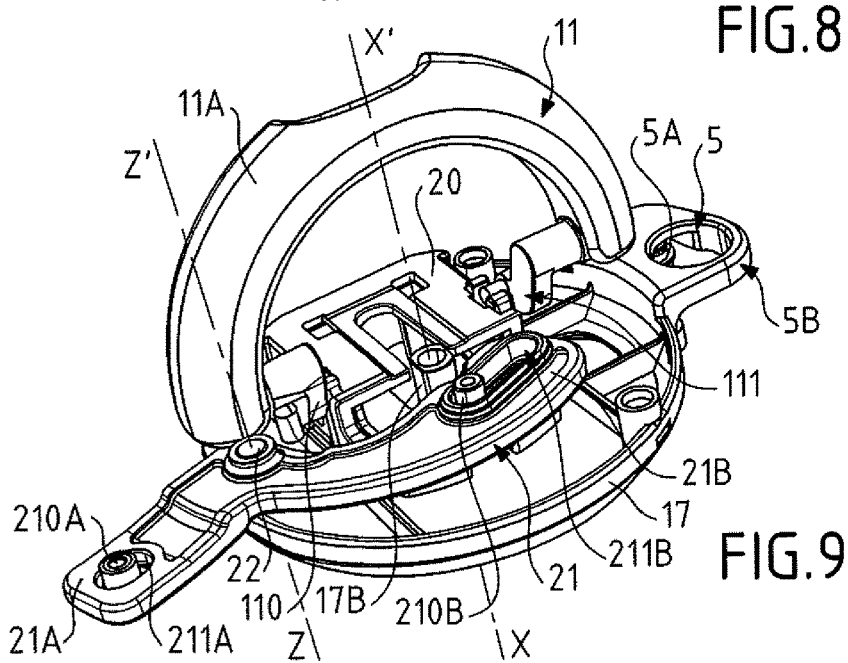
FIG.9

BAYONET-FITTING PRESSURE COOKER PROVIDED WITH GUIDE ELEMENTS

CROSS-REFERENCES TO RELATED APPLICATIONS

This application claims priority to, and the benefit of, French Patent Application No. FR-15 55001, filed Jun. 2, 2015, entitled "A Bayonet Fitting Pressure Cooker Provided With Guide Elements," the entire contents of which is incorporated herein by reference.

BACKGROUND

The present invention relates to the general technical field of utensils for cooking food under pressure, and in particular to household utensils of the pressure cooker type that are designed to form cooking enclosures capable of allowing pressure to build up in them so as to cook food contained in them under steam pressure.

SUMMARY OF THE INVENTION

The present invention relates more particularly to a cooking utensil for cooking food under pressure that comprises a vessel, a lid, and a bayonet-fitting locking system comprising first and second series of locking projections that are integral respectively with the lid and with the vessel.

Cooking utensils for cooking food under pressure, in particular for household use, are well known. They generally comprise a metal vessel onto which a lid that is also made of metal is designed to be mounted in sealed manner, via a flexible annular seal, in such manner as to constitute a cooking enclosure capable of allowing pressure to build up in it. The lid is designed to be coupled to the vessel via locking means enabling the pressure cooker to go between a locked configuration, in which the lid is locked relative to the vessel, and in which the cooking enclosure is capable of allowing pressure to build up in it, and an unlocked configuration, in which the lid can be freely separated from the vessel. Different types of locking means are well known in the prior art. One of the systems that are in most widespread use is the locking system having bayonet fittings, that system being based on implementing vessel and lid ramps that are designed to come into mutual sliding abutment once the lid has been turned so as to provide a retaining mechanical coupling that prevents the vessel and the lid from coming apart under the effect of the build-up of pressure. The lid ramps are conventionally formed by locally and inwardly folding over the annular dropped edge of the lid, while the vessel ramps are obtained by folding over and cutting out the free top edge of the vessel.

Such a locking system having bayonet fittings is generally satisfactory, in particular because it is relatively light in weight, it is simple to manufacture, and it is reliable. However, it also suffers from certain significant drawbacks, in particular in terms of practicality and ergonomics. Firstly, the very principle of locking by bayonet fittings requires the user to place the lid on the vessel in a precise and specific arrangement enabling the lid ramps to pass through cutouts provided in the top edge of the vessel, so that they find themselves below the vessel ramps, in a ready-for-locking position, from which position the user can then bring the lid and vessel ramps into locking correspondence, by turning the lid on the vessel. In practice it is often awkward and not ergonomic to position the lid on the vessel in the above-mentioned precise and specific arrangement. In addition, once the lid is in the ready-for-locking position, the user must then exert on the lid a significant force for turning it in a predetermined direction, which is not necessarily intuitive, possibly combined with exerting a downward pressure on the lid. Such locking manipulation is not only unintuitive and awkward but also requires a certain amount of physical strength, in particular because of the friction at the seal interposed between the lid and the vessel. In practice, locking a bayonet-fitting pressure cooker thus requires the lid to be mounted correctly onto the vessel, for which several attempts are frequently needed, and then requires the pressure cooker to be taken hold of with both hands, in such a manner as to hold the vessel stationary with one hand and to exert a force with the other hand for turning the lid relative to the vessel, while also exerting a downward pressure on the lid, until the locking configuration is reached. From this point of view, bayonet-fitting pressure cookers are generally much less easy and much less practical to use than, for example, pressure cookers having jaws, but such pressure cookers having jaws are much heavier than bayonet-fitting pressure cookers, and generally cost much more to manufacture.

The invention therefore proposes to remedy the various drawbacks described above, and to propose a novel cooking utensil for cooking food under pressure that is particularly lightweight, safe, and quick and inexpensive to manufacture, while being particularly practical and ergonomic.

Another object of the invention is to propose a novel cooking utensil for cooking food under pressure that is very easy to use, and in particular easy to use with one hand only.

Another object of the invention is to propose a novel cooking utensil for cooking food under pressure that is particularly simple and reliable to lock.

Another object of the invention is to propose a novel cooking utensil for cooking food under pressure that, in natural and intuitive manner, is highly suggestive as to how it should be used.

Another object of the invention is to propose a novel cooking utensil for cooking food under pressure that procures a high level of safety while it is being used.

Another object of the invention is to propose a novel cooking utensil for cooking food under pressure that is of design that makes it completely unnecessary for the user manually to hold the vessel stationary while the user is locking the lid relative to the vessel.

Another object of the invention is to propose a novel cooking utensil for cooking food under pressure that implements a locking control mechanism that is particularly robust and compact.

Another object of the invention is to propose a novel cooking utensil for cooking food under pressure that is of design making it possible to minimize the manual force exerted by a user for causing the locking to take place.

Another object of the invention is to propose a novel cooking utensil for cooking food under pressure that has a locking control mechanism that is particularly simple, lightweight, and reliable.

Another object of the invention is to propose a novel cooking utensil for cooking food under pressure that is provided with a control member that makes it particularly intuitive to perform both locking and unlocking.

Another object of the invention is to propose a novel cooking utensil for cooking food under pressure that is easy and practical to stow and to wash in a dish washer.

Another object of the invention is to propose a novel cooking utensil for cooking food under pressure that considerably limits the risk of a user lifting the entire utensil by the lid.

Another object of the invention is to propose a novel cooking utensil for cooking food under pressure that is of design that limits the risk of the user letting go of the lid.

The objects assigned to the invention are achieved by means of a cooking utensil for cooking food under pressure having a vessel, a lid, and a bayonet-fitting locking system comprising first and second series of locking projections integral respectively with the lid and with the vessel, said utensil being characterized in that it includes a lid subassembly that includes said lid and a support attached to said lid in such a manner that said lid can pivot relative to said support, said lid subassembly and said vessel being designed to be capable of being associated with each other in at least a first arrangement in which the lid overlies the vessel so that said first series of projections are significantly higher than said second series of projections, and a second arrangement obtained from said first arrangement by moving said lid subassembly downwards until said first series of projections are significantly lower than said second series of projections, said support and said vessel also being provided respectively with complementary first and second guide elements that are designed to co-operate mutually whenever said lid subassembly and said vessel are associated with each other in said first arrangement in order to guide said lid subassembly as it moves downwards.

Other features and advantages of the invention appear and can be seen in more detail on reading the following description with reference to the accompanying drawings, given merely by way of non-limiting illustration, and in which:

BRIEF DESCRIPTION OF THE DRAWINGS

FIG. 1 is a diagrammatic perspective view of a cooking utensil of the invention for cooking food under pressure that has bayonet-fitting locking, in which utensil the lid subassembly and the vessel are associated with each other in the second arrangement, corresponding to a pre-locking configuration of the utensil;

FIG. 2 is a diagrammatic perspective view from above of the vessel of the pressure cooker of FIG. 1, said vessel being provided with two side handles enabling it to be manipulated;

FIG. 3 is a view from above of the pressure cooker of FIG. 1;

FIG. 4 shows the lid subassembly of the utensil of FIGS. 1 and 3, said lid subassembly being in an unlocking configuration, ready to come and fit over the top of the vessel of FIG. 2 to achieve the second arrangement;

FIG. 7 is a diagrammatic perspective view of a design detail of the pressure cooker of FIGS. 1 to 6, making it possible, in particular, to see the co-operation between the support and the vessel handle for locking the relative angular position of the lid and of the vessel in a horizontal plane (the lid and the vessel not being shown) when the lid subassembly and the vessel are associated with each other in the second arrangement;

FIG. 8 is a view from below showing the design detail of FIG. 7, except that the vessel handle has been omitted;

FIG. 9 is a diagrammatic perspective view of an embodiment detail of the pressure cooker of FIGS. 1 to 8, more precisely relating to the control member for controlling locking/unlocking and to the transformation device for transforming the movement of the control member into pivoting of the lid relative to the support, with which the utensil is equipped in this example;

DETAILED DESCRIPTION

Figure 5:
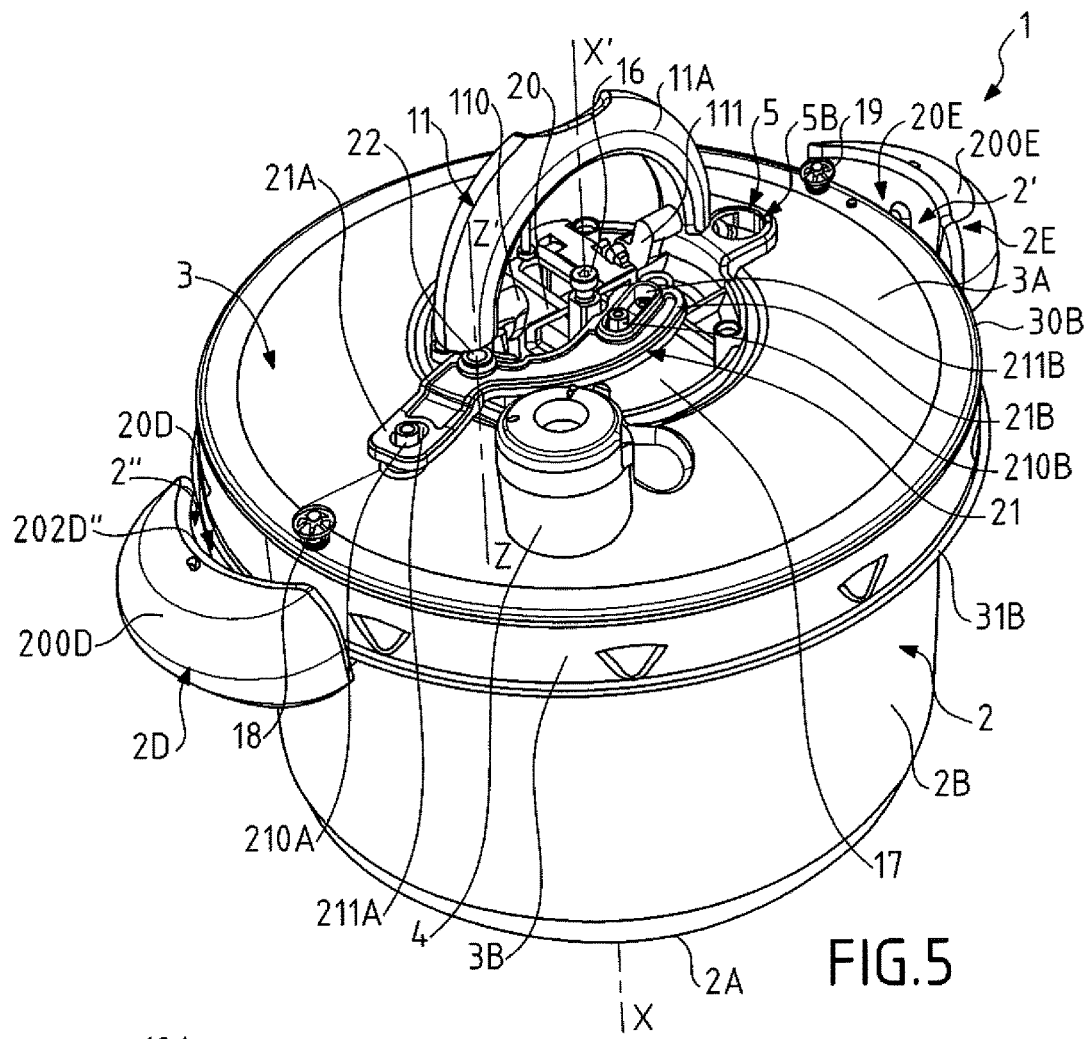
FIG. 5 shows the pressure cooker of FIGS. 1 to 4, the support not being shown in order to make it possible to see a movement-transformation device for transforming the manual movement of the control member (with which the utensil is equipped in this example) into pivoting of the lid relative to the support.

As shown in the figures, the invention relates to a cooking utensil 1 for cooking food under pressure, which utensil is designed to cook a variety of food under a level of pressure greater than atmospheric pressure, in the presence of vapor, e.g. steam. Said vapor or steam is generated by a cooking liquid, e.g. an aqueous liquid, being heated inside the utensil 1 in the presence of the food. The utensil 1 of the invention is preferably designed for household use, but it should be understood that the invention may also relate to professional or semi-professional utensils. The utensil 1 of the invention is designed to allow pressure to build up exclusively under the effect of a heat source (which may be incorporated or external), without any external pressure being supplied. The cooking utensil 1 for cooking food under pressure is thus advantageously designed to be subjected to an external heat source, such as, for example, a hotplate or ring (operating by induction, electricity, or gas), and thus constitutes a pressure cooker not having an incorporated heat source and preferably designed to be placed on an independent hotplate or ring for heating the contents. The cooking apparatus 1 of the invention includes at least one vessel 2 forming a cooking receptacle designed to receive the food to be cooked and, in this example, being substantially circularly symmetrical about a central vertical axis X-X', which extends in a direction that is similar to the vertical direction when the utensil 1 is operating normally, i.e. when it is resting on a horizontal plane. The vessel 2 comprises a bottom 2A, and an annular side wall 2B that extends upwards between said bottom 2A and a free top edge 2C, which, in this example, is of circular shape and defines an access opening that gives access to the inside of the vessel 2. The shaping of the free top edge 2C is described in more detail below, in relation to the locking means of the utensil 1. As shown in the figures, the vessel 2 is advantageously provided with at least one handle 2D, 2E that is fastened to said vessel 2, in such a manner as to project outwards from said vessel. As shown in the figures, said handle 2D projects from the utensil 1 in which the vessel 2 locally forms the outer casing, so that a user can manipulate the vessel 2, and indeed the utensil 1, by means of said handle 2D. In the embodiment shown in the figures, said handle 2D is mounted on the outside face of the side wall 2B of the vessel 2, in such a manner as to extend radially outwards from the vessel 2 and thus to form graspable means designed to be taken hold of manually by the user in order to manipulate the vessel 2 (e.g. to lift it and to move it). In the embodiment shown in the figures, the cooking utensil 1 has two identical handles 2D, 2E fastened to the side wall 2B of the vessel 2 in diametrically opposite manner about the central axis X-X', said handles 2D, 2E being, in this example, disposed in the vicinity of the free top edge 2C of the vessel 2. However, it is quite possible for the vessel 2 to be provided with a single vessel handle, or with more than two vessel handles (e.g. three or four), without going beyond the ambit of the invention.

The utensil 1 of the invention also includes a lid 3 designed to be associated with the vessel 2 and to be locked relative to said vessel 2 to form a cooking enclosure suitable for allowing pressure to build up in it, i.e. a cooking enclosure that is sufficiently hermetically sealed to allow the pressure of the utensil 1 to build up. In order to obtain such leaktight, hermetic sealing, the utensil 1 advantageously includes a seal (not shown), preferably formed by a flexible annular gasket, made of elastomer, for example, and designed to be interposed between the lid 3 and the vessel 2, thereby preventing any uncontrolled leak of steam and/or of air between the inside of the enclosure and the outside. The lid 3 is independent of the vessel 2, i.e. it is not attached or connected to it permanently (which, in particular, means that the lid 3 and the vessel 2 are not connected together by a hinge or some other mechanical coupling). The lid 3 may thus be freely manipulated and moved by a user, independently of the vessel 2. The lid 3 advantageously has a shape that is complementary to the shape of the vessel 2, e.g. substantially disk-shaped, and that advantageously extends in a mean plane that is substantially parallel to the mean plane in which the bottom 2A of the vessel 2 extends (i.e. a plane that is substantially horizontal in this example) once it is mounted and locked on said vessel. In the embodiment shown in the figures, the lid 3 includes a disk-shaped lid element 3A of shape and dimensions complementary to the shape and dimensions of the access opening delimited by the free top edge 2C of the annular side wall 2B of the vessel 2. In this embodiment, the lid 3 advantageously includes an annular band 3B, e.g. of substantially cylindrical or frustoconical shape, extending between a first annular edge 30B that is integral with the disk-shaped lid element 3A (in this example, at the periphery thereof), and a free second annular edge 31B, which is, for example, itself extended by an end flange. As shown in the figures, the disk-shaped lid element 3A extends substantially in a horizontal mean plane, i.e., in this example, a mean plane parallel to the mean extension plane of the bottom 2A of the vessel 2 when the lid 3 is associated with the vessel 2 to form the cooking enclosure, while the annular band 3B extends substantially vertically, i.e. parallel to the central axis X-X', the end flange extending substantially horizontally. Naturally, this in no way excludes the possibility of the disk-shaped lid 3A being, as shown in the figures, slightly domed or dished locally, e.g. to accommodate a control mechanism. In the embodiment shown in the figures, the annular band 3B is formed by an annular dropped edge that extends downwards from the periphery of the disk-shaped lid element 3A. In this embodiment, the lid 3 is designed to come to fit over the top of the vessel 2 in substantially snug manner so as to form the cooking enclosure, so that the annular band 3B externally surrounds the top of the annular side wall 2B and the free top edge 2C, while the disk-shaped lid element 3A rests on and bears against the free edge 2C via the sealing gasket interposed between the vessel 2 and the lid 3. However, it is quite possible, alternatively, for the annular band 3B to be designed to fit into the vessel 2 so as to be surrounded by and contained in the vessel 2, without going beyond the ambit of the invention.

The cooking utensil 1 of the invention for cooking food under pressure advantageously includes pressure regulation means 4, such as, for example, a valve, for maintaining the pressure prevailing in the cooking enclosure at a substantially constant predetermined value referred to as the "operating pressure", which value exceeds atmospheric pressure by a value that, for example, lies substantially in the range 10 kilopascals (kPa) to 120 kPa, and is preferably about 100 kPa. The cooking utensil 1 for cooking food under pressure may include other operating members (e.g. opening safety means 5, an overpressure safety valve 6, etc.).

The utensil 1 of the invention also includes a bayonet-fitting locking system, in order to enable the cooking enclosure formed by the association of the lid 3 and of the vessel 2 to reach at least the above-mentioned operating pressure without any risk of the lid 3 coming off under the effect of the pressure prevailing inside the enclosure. In other words, the locking system is designed to provide a mechanical coupling between the vessel 2 and the lid 3 that is sufficiently robust to prevent the lid 3 from separating from the vessel 2 under the effect of pressure building up inside the cooking enclosure. More precisely, said bayonet-fitting locking system is designed to lock and to unlock the lid 3 relative to the vessel 2 by pivoting the lid 3 relative to the vessel 2, in this example about said central vertical axis X-X', so as thus to cause the utensil 1 to go from a ready-for-locking configuration, in which the lid 3 is mounted on the vessel 2 and is resting freely on said vessel 2 (FIGS. 1 and 3), to a locking configuration in which the vessel 2 and the lid 3 interact to prevent them from being separated freely (FIGS. 16 and 17), and vice versa. Thus, in the embodiment shown in the figures, the utensil 1 goes from its ready-for-locking configuration to its locking configuration by the lid 3 being turned relative to the vessel 2 in a clockwise direction S1 over a predetermined angular stroke about the central axis X-X', and goes from its locking configuration to its ready-for-locking configuration by the lid 3 being turned relative to the vessel 2 in a counterclockwise opposite direction S2 over said predetermined angular stroke about the central axis X-X' (FIGS. 3 and 17), it being understood that the reverse is quite possible without going beyond the ambit of the invention (S1 then being the counterclockwise direction and S2 being the clockwise direction). For this purpose, the bayonet-fitting locking system of the cooking utensil 1 advantageously includes first and second series of projections 7A-7J, 8A-8J that are integral respectively with the lid 3 and with the vessel 2, and that, in order to lock and unlock the lid 3 relative to the vessel 2, are designed to come to engage and to disengage mutually by the lid 3 being turned relative to the vessel 2 about the central vertical axis X-X' over said predetermined angular stroke. As is well known per se, the projections 7A-7J, 8A-8J of each of the first and second series are designed to co-operate in pairs, i.e. each of the projections of one of said series is brought, by the lid 3 being turned relative to the vessel 2, to go under a corresponding projection of the other series to lock the lid 3 relative to the vessel 2. In the embodiment shown in the figures, said annular band 3B carries said first series of projections 7A-7J. Preferably, said projections 7A-7J of the first series, integral with the lid 3, project radially inwards from the lid 3, while the projections 8A-8J of the second series, integral with the vessel 2, project radially from the outside face of the side wall 2B of the vessel 2, outwards from said vessel 2. However, it is quite possible for the locking projections 7A-7J on the lid to project outwards from the lid 3 and for the vessel projections 8A-8J to project radially inwards from the vessel. The invention is therefore not limited to a particular configuration of the locking ramps of the bayonet-fitting locking system, the essential requirement being that lid projections 7A-7J and the vessel projections 8A-8J respectively form lid ramps and vessel ramps that co-operate mutually by the vessel 2 and the lid 3 being turned relative to each other, in this example about the central vertical axis X-X', so that the lid ramps come to be positioned under the vessel ramps in order to form a mechanical coupling between the vessel 2 and the lid 3 that is capable of withstanding the internal pressure prevailing inside the cooking enclosure. In the example shown in the figures, each of the lid projections 7A-7J is constituted by a three-dimensional (3D) element obtained by local 3D deformation of the material of which the casing of the lid 3 is made, and, more precisely, of which the annular band 3B is made, along which band the projections 7A-7J are preferably disposed, optionally at regular intervals. However, the invention is absolutely not limited to implementation of specific projections 7A-7J, and in particular projections obtained by die-stamping as in the example shown in the figures. It is, for example, quite possible for the lid projections 7A-7J to be formed by flat tongues obtained by localized inward folding-over of the free edge 31B of the annular band 3B of the lid 3. In the example shown in the figures, the vessel projections 8A-8J are formed by an annular rim that projects outwards beyond and from the free top edge 2C, notches 9A-9J being provided through said annular rim in such a manner as to allow said lid projections 7A-7J to pass through, so that the portions of said annular rim that extend between each notch 9A-9J form respective vessel ramps designed to co-operate with the lid projections 7A-7J that form the lid ramps. Thus, when the lid 3 comes to fit over the top of the vessel 2, the lid projections 7A-7J can pass through the notches 9A-9J so as to be situated lower than the annular rim. The utensil 1 is then in its pre-locking configuration (also referred to herein as the "ready-for-locking" configuration), from which the locking configuration can be reached merely by turning the lid 3 relative to the vessel 2 about the vertical axis X-X', thereby causing the projections 7A-7J of the lid 3 and the notches 9A-9J of the annular rim to be shifted angularly to achieve locking of the "bayonet-fittings" type. Preferably, in the embodiment shown in the figures, the lid projections 7A-7B are located on the annular band 3B of the lid 3 at some distance from the free second circular edge 31B of said annular band 3B, in such a manner that, below said 3D elements, the annular band 3B forms a self-centering skirt for self-centering the lid 3 relative to the vessel 2. In co-operation with the side rim that is almost continuous (except for the notches 9A-9J) and that forms the vessel ramps, this annular skirt enables the lid 3 to be positioned naturally and spontaneously in a manner such that it is centered relative to the vessel 2 when it is placed on it.

In accordance with the invention, the utensil 1 includes a lid subassembly (shown separately in FIG. 4) which includes both the lid 3 and a support 10 attached to said lid 3, permanently in this example, in such a manner that said lid can pivot relative to said support 10, preferably between two positions corresponding respectively, in this example, to an unlocking configuration and to a locking configuration of said lid subassembly. In the embodiment shown in the figures, said lid subassembly is independent from the vessel 2, so that it can be freely manipulated and moved independently of the vessel 2. In other words, said subassembly is advantageously not attached or connected to the vessel 2 permanently (i.e., in particular, the lid subassembly and the vessel 2 are not connected together by a hinge or by some other mechanical coupling). The lid subassembly may thus be freely manipulated and moved by a user, independently of the vessel 2, over a free path. Advantageously, and as shown in the figures, said independent lid subassembly rests freely against the vessel 2 (and, in this example, on the vessel 2) when said lid subassembly and said vessel 2 are associated with each other in said second arrangement, which advantageously corresponds to the ready-for-locking configuration. This means that, in the second arrangement (and preferably also in the first arrangement), the lid subassembly is not attached to the vessel 2 (in particular by a hinge or any other articulated coupling means).

Figure 16:
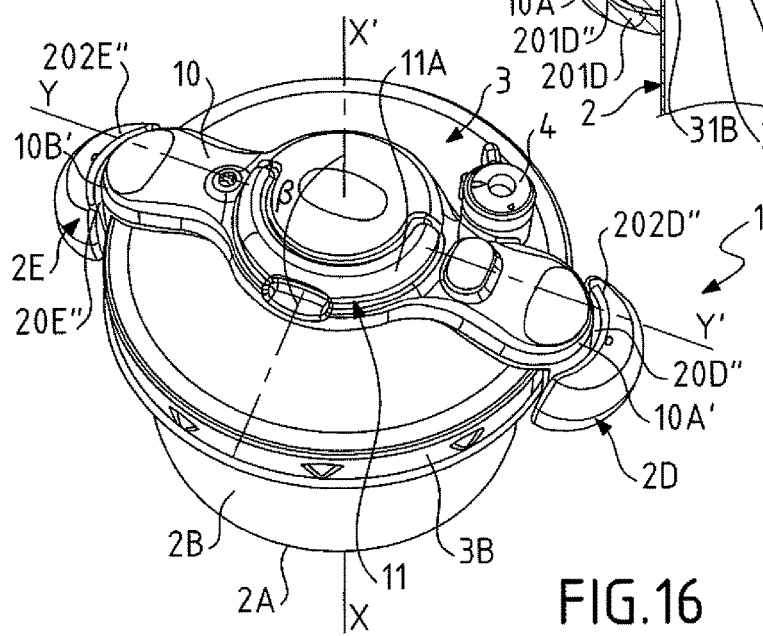
FIG. 16 is a diagrammatic perspective view of the utensil of the preceding figures, with the lid subassembly in the locking configuration, so that the lid is locked relative to the vessel, the control member being lowered towards the lid in a retracted position corresponding to locking.
Figure 17:
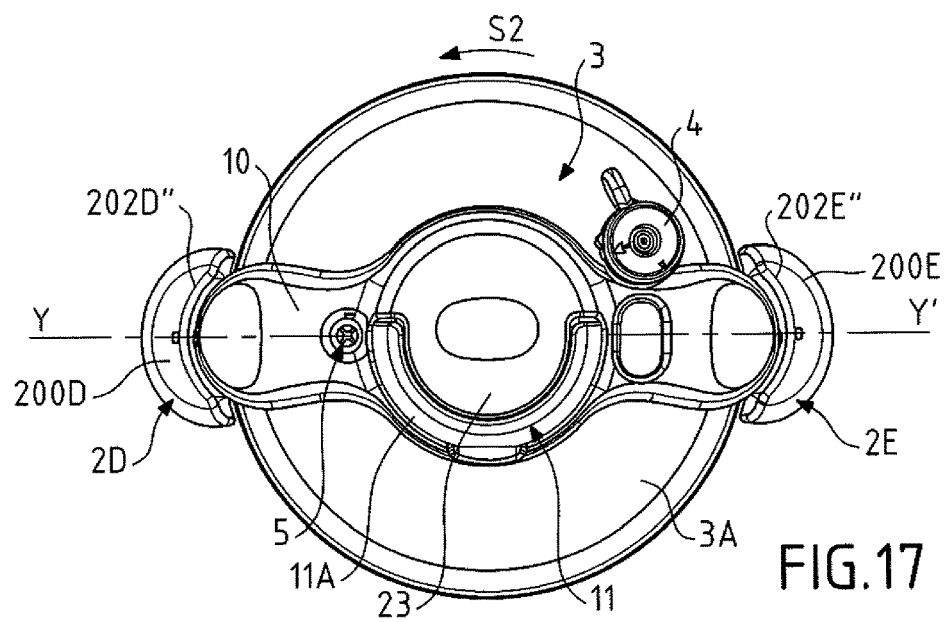
FIG. 17 is a view from above of the pressure cooker of FIG. 16.
Figure 18:
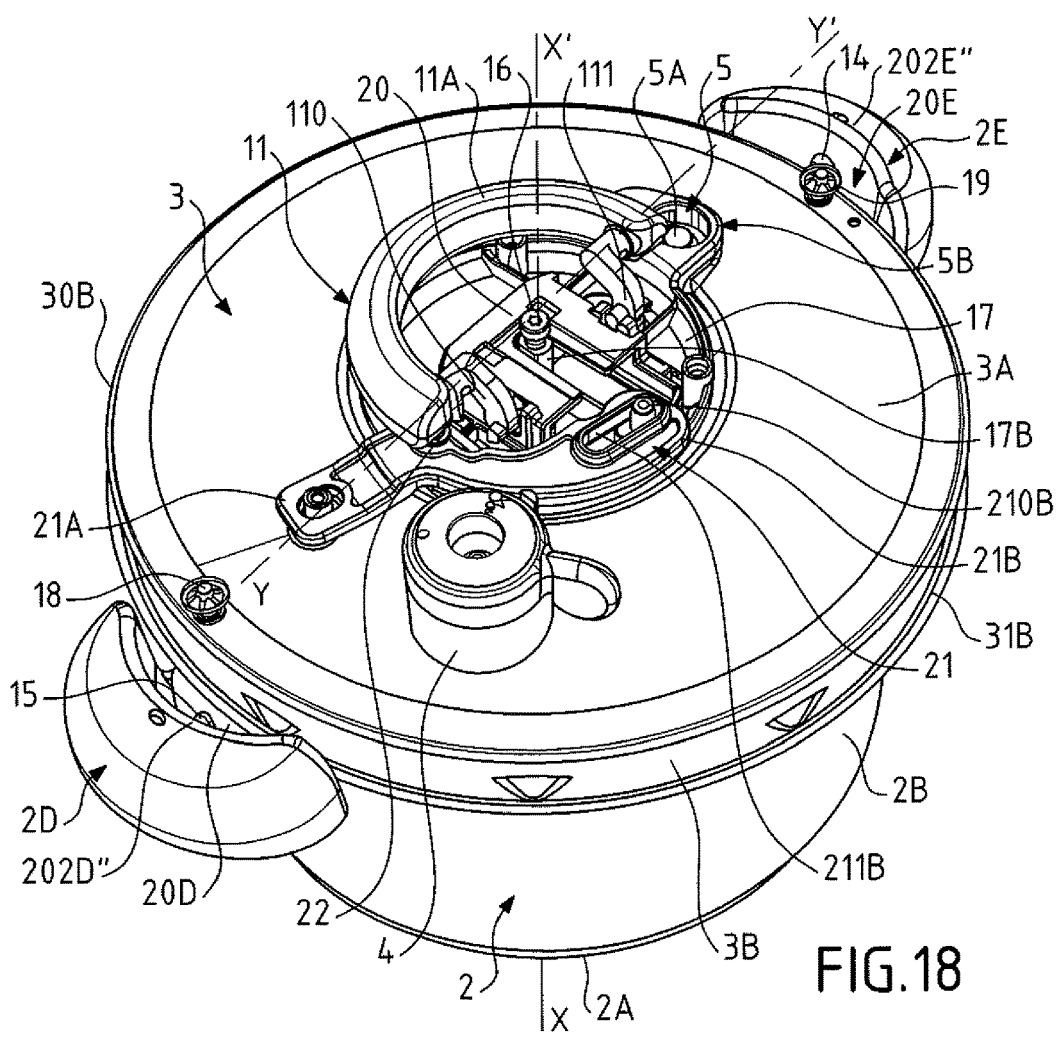
FIGS. 18 to 20 are views analogous respectively to the views of FIGS. 5, 8, and 9 & 10, except that the lid subassembly is in a locking configuration, so that the lid is locked relative to the vessel, the control member being lowered towards the lid in a retracted position corresponding to the locking.
Figure 19:
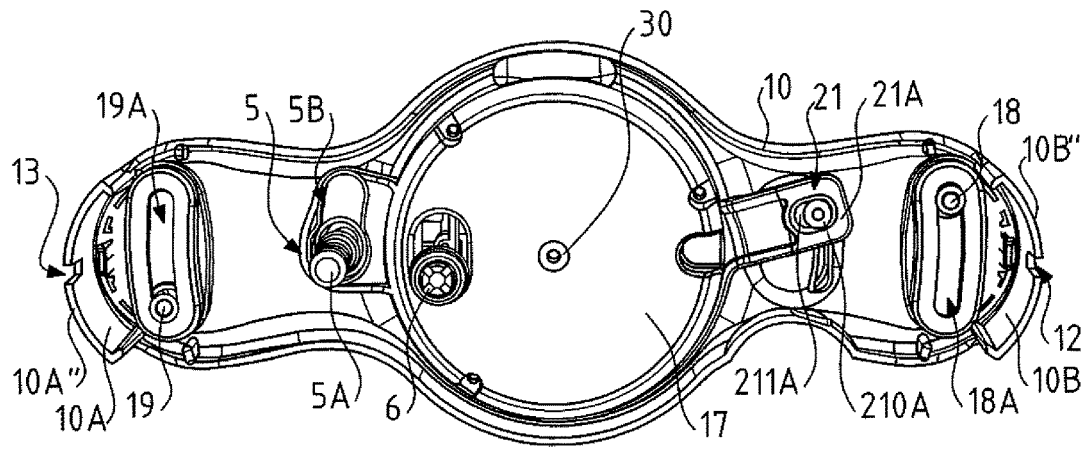
Figure 20:
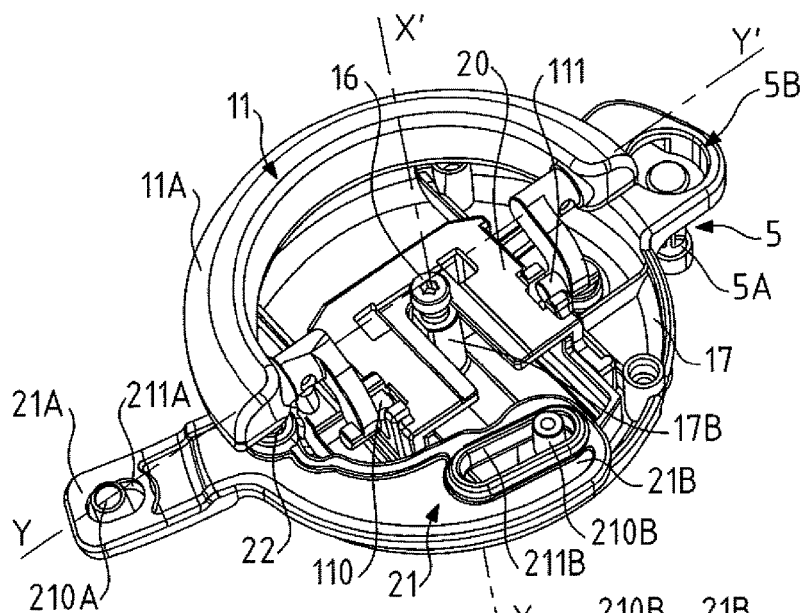
Figure 21:
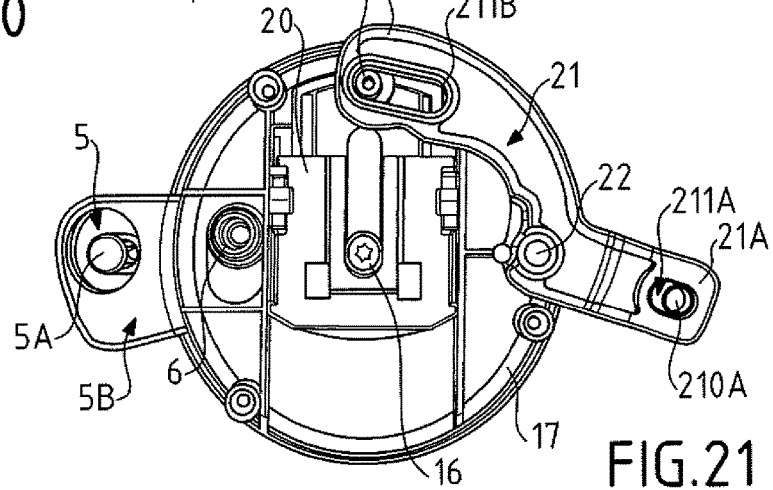
FIG. 21 is a view from above of a detail of the control mechanism equipping the utensil of the preceding figures, said mechanism being in a state corresponding to the lid being locked relative to the vessel.

The two positions between which the lid 3 can pivot relative to the support 10 are advantageously separated by a predetermined angular stroke corresponding to the stroke required to cause the utensil 1 to go from its pre-locking configuration shown in FIG. 1 to its locking configuration shown, for example, in FIG. 16. For example, in the embodiment shown in the figures, the utensil 1 is provided with at least one guide stud 18, and preferably with two guide studs 18, 19 that are disposed diametrically opposite each other about the central axis X-X' and attached to the lid 3 permanently (e.g. by being welded to said lid in such manner as to extend vertically upwards from the outside surface of said lid 3, and, in this example, at the periphery of said lid, as shown in the figures). Each of said guide studs 18, 19 is designed to slide in a complementary elongate guide groove 18A, 19A provided in the support 10, e.g. towards each end of said support 10. The length of each groove 18A, 19A is adapted, in this example, to the angular stroke of the lid 3 relative to the support 10. Each stud 18, 19 is also provided with a head of larger cross-section that co-operates with the edges of the corresponding groove 18A, 19A to retain the support 10 vertically and to prevent it from moving vertically away from the lid 3.

The lid subassembly thus forms an independent single unit that is designed to be associated with the vessel subassembly formed by the vessel 2 itself and by the vessel handles 2D, 2E to form the cooking enclosure. Preferably, said lid subassembly also includes a sealing gasket (not shown) that advantageously has an annular shape and that is preferably carried by the lid 3. Said sealing gasket is designed to be interposed between the lid 3 and the vessel 2 when the lid 3 is locked relative to the vessel 2 so as to seal the cooking enclosure. In the embodiment shown in the figures, the support 10 is attached to said lid 3 in such a manner that said lid can pivot relative to said support 10 about said central vertical axis X-X'. The pivot coupling between the lid 3 and the support 10 may be formed by any means known to the person skilled in the art.

In accordance with the invention, said lid subassembly and said vessel 2 are designed to be capable of being associated with each other in at least a first arrangement (shown in FIGS. 10 to 13) in which the lid 3 overlies the vessel 2, i.e. it is above and substantially in register with the vessel 2, preferably so as to extend substantially parallel to the bottom 2A of the vessel 2, so that said first series of projections 7A-7J are significantly higher than said second series of projections 8A-8J. Said first arrangement is a pre-docking arrangement, in which the lid subassembly and the vessel 2 find themselves temporarily, and indeed fleetingly, while the lid subassembly is being mounted on the vessel 2 by a user with a view to closing the vessel 2 in order to form a sealed cooking enclosure. In this first arrangement, the lid 3 is above the vessel 2, and kept some distance away from it by the user who is mounting the lid subassembly manually onto the vessel 2. The weight of the lid subassembly is thus not yet exerted on the vessel 2 and said first series of projections 7A-7J have not yet gone through the notches 9A-9J. The first arrangement thus corresponds to an unstable positioning of the lid subassembly relative to the vessel 2 that takes place momentarily over the path followed by the lid subassembly while it is being brought towards the vessel 2 with a view to forming the cooking enclosure. At the time when the lid subassembly and the vessel 2 are in the first arrangement in question, the height (e.g. measured along the central vertical axis X-X', from the bottom 2A of the vessel 2) of the first series of projections 7A-7J carried by the lid 3 is thus significantly greater than the height of the second series of projections 8A-8J carried by the vessel 2.

Figure 15:
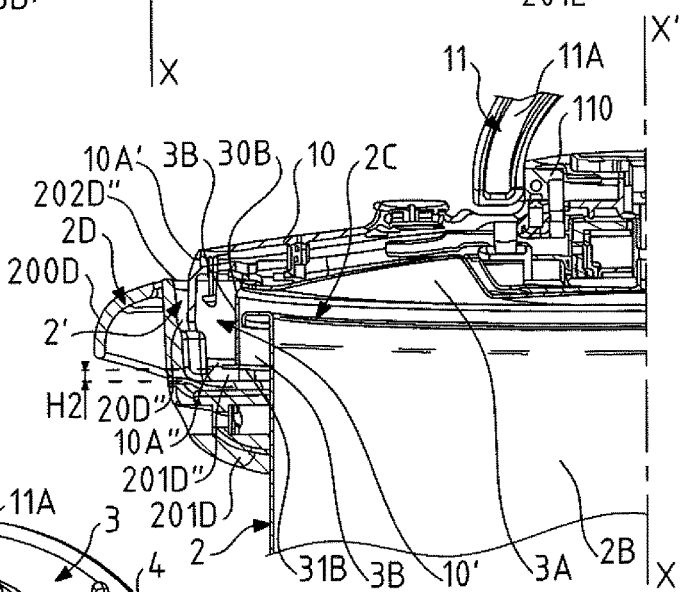
FIG. 15 is a section view of a detail embodiment of the utensil of FIGS. 1 and 14.

In accordance with the invention, said lid subassembly and said vessel 2 are also designed to be associated with each other in a second arrangement, obtained from said first arrangement by moving said lid subassembly downwards (i.e., in this example moving it vertically downwards preferably without moving it in rotation) until said first series of projections 7A-7J carried by the lid 3 are significantly lower than said second series of projections 8A-8J carried by the vessel 2. The second arrangement thus forms a pre-locking arrangement (corresponding to the above-mentioned pre-locking configuration of the utensil 1), from which it is possible to lock the lid 3 relative to the vessel 2 merely by pivoting the lid 3 relative to the support 10 and to the vessel 2. The second arrangement thus allows the lid 3 to pivot relative to the support 10 to bring said first series of projections 7A-7J under said second series of projections 8A-8J and into locking correspondence. Thus, when the lid subassembly and the vessel 2 are associated with each other in said first arrangement, the lid ramps (formed by the first series of projections 7A-7J) are disposed in register with the series of notches 9A-9J so that the downward movement leading to the second arrangement enables each lid projection 7A-7J to go through a corresponding notch 9A-9J to find itself at a height significantly less than the height of the projections 8A-8J forming the vessel ramps. It then suffices to cause the lid 3 to pivot relative to the support 10 over the above-mentioned predetermined angular stroke in order thereby to cause the lid subassembly, while it is associated with the vessel 2 in the second arrangement, to go from its unlocking configuration to its locking configuration, so as to bring the lid ramps 7A-7J into correspondence with the vessel ramps 8A-8J, under said vessel ramps, thereby locking the lid 3 relative to the vessel 2. Advantageously, said lid subassembly and said vessel 2 are designed so that when they are associated with each other in said second arrangement, the lid subassembly rests and bears directly against the vessel 2, in this example via the sealing gasket carried by the lid 3, which gasket is interposed between the free top edge 2C and the lid 3. The second arrangement is thus advantageously a pre-locking arrangement, in which the lid subassembly rests in equilibrium on and against the free top edge 2C of the vessel 2 (the user then no longer exerting any force for manually lifting the lid subassembly). In the example shown in the figures, the downward movement is a movement in translation parallel to said central vertical axis X-X', i.e. in order to go from the first arrangement to the second arrangement, the lid subassembly slides vertically, over a rectilinear path, towards the bottom 2A of the vessel 2, while said vessel remains stationary. As shown in the figures, the vessel 2 is locally surrounded by the free second annular edge 31B when said lid subassembly and said vessel 2 are associated with each other in said second arrangement. This means that, in the second arrangement, as appears in particular in FIG. 15, the annular band 3B is positioned substantially concentrically to the side wall 2B of the vessel 2, in such a manner as to surround the free end portion of said wall, including at least the free top edge 2C. Conversely, when said lid subassembly and said vessel 2 are associated with each other in the first arrangement, said free second annular edge 31B is higher than the vessel 2, as appears in particular in FIGS. 11 to 13, and therefore does not surround said vessel 2. In other words, when the lid subassembly and the vessel 2 are positioned relative to each other in said first arrangement, the free second annular edge 31B is at a height significantly greater than the height of the free top edge 2C of the vessel 2, the downward movement making it possible to go from the first arrangement to the second arrangement consisting in causing the annular band 3B to move downwards in such a manner that the free second annular edge 31B is at a height below the height of the free top edge 2C of the vessel 2, this relative positioning corresponding to the second arrangement.

In accordance with the invention, said support 10 and said vessel 2 are provided respectively with a first guide element 10', 10" and with a second guide element 2', 2", the first and second guide elements being mutually complementary and designed to co-operate as soon as said lid subassembly and the vessel 2 are associated with each other in said first arrangement, in order to guide said lid subassembly as it moves downwards as mentioned above, making it possible to go from the first arrangement to the second arrangement. The complementary first and second guide elements 10', 10", 2', 2" are thus designed to be capable of being in a specific relative position, when the lid subassembly and the vessel 2 are associated with each other in the first arrangement, which procures a function of assisting with the positioning of the support 10 and of the vessel 2, in order to guide the lid subassembly in its downward movement leading to the second arrangement. This means that when the lid subassembly and the vessel 2 are associated in the above-mentioned first arrangement, the first guide element 10', 10" interacts mechanically with the complementary second element 2', 2" to help the user place the support 10 and the vessel 2 in a predetermined relative position from which said lid subassembly and the vessel 2 can reach their second arrangement merely by them being moved closer together in translation only, parallel to the central vertical axis X-X' of the support 10 and of the vessel 2. By means of this characteristic, the lid subassembly is guided early along its vertical downward path towards the vessel 2 to come and fit over the top of said vessel in the second arrangement, i.e. it is guided even before the lid ramps interact in any manner with the annular rim that projects outwards beyond and from the free top edge 2C to form the vessel ramps 8A-8J and the through notches 9A-9J. This makes it possible to guarantee that, when the lid 3 then actually fits over the top of the vessel 2, it is positioned properly relative to the vessel 2 to enable the lid ramps 7A-7J to go through the notches 9A-9J so that said lid ramps can be lower than the vessel ramps, in a pre-locking configuration. This characteristic greatly facilitates appropriately positioning the lid 3 relative to the vessel 2, while avoiding having to use several "blind" attempts, whereas with prior art utensils, it is frequent for users to mount the lid 3 relative to the vessel 2 in an incorrect angular position not enabling the lid ramps 7A-7J to pass through the through notches 9A-9J directly and at the first attempt. The invention has thus made it possible to establish that implementing prior guiding, which starts taking place not when the first series of projections 7A-7J are substantially at the same height or lower than said second series of projections 8A-8J, but rather while said first series of projections 7A-7J are still at a height greater than the height of said second series of projections 8A-8J, contributes to making the pressure cooker 1 particularly ergonomic and practical.

Advantageously, said complementary first and second guide elements 10', 10", 2', 2" are designed to guide the lid subassembly substantially continuously as it moves downwards until said second arrangement is obtained. This means that said complementary first and second guide elements 10', 10", 2', 2" interact mutually over the entire path of the lid subassembly while it is moving downwards, in order to prevent said lid subassembly from fully leaving said path, e.g. by shifting angularly in the horizontal plane perpendicular to the central vertical axis X-X' or in a vertical plane parallel to said central vertical axis X-X', or by shifting axially in horizontal translation. In other words, said complementary first and second guide elements 10', 10", 2', 2" co-operate mutually as soon as said lid subassembly and said vessel 2 are associated with each other in the first arrangement and continue to co-operate in guiding and assisting with positioning at least until the second arrangement is obtained.

Advantageously, said co-operation of said first and second guide elements 10', 10", 2', 2" for guiding said lid subassembly as it moves downwards between the first arrangement and the second arrangement is co-operation of the male/female type, based on inserting all or some fraction of a male portion, i.e. a portion having a substantially convex surface, into a female portion, i.e. a portion presenting a concave surface, so as to perform guiding by bringing the male and female portions to face each other. Said male/female co-operation is based, for example, on mutual interfitting engagement of said first and second guide elements 10', 10", 2', 2". To this end, said first and second guide elements 10', 10", 2', 2" respectively have a male shaped portion advantageously having a domed profile and a female shaped portion advantageously having a dished profile complementary to the domed profile, said male and female shaped portions thus being complementary. However, it is quite possible, without going beyond the ambit of the invention, for it to be, conversely, the second guide element 2', 2" that has a male shaped portion and the first guide element 10', 10" that has a female shaped portion.

Figure 6:
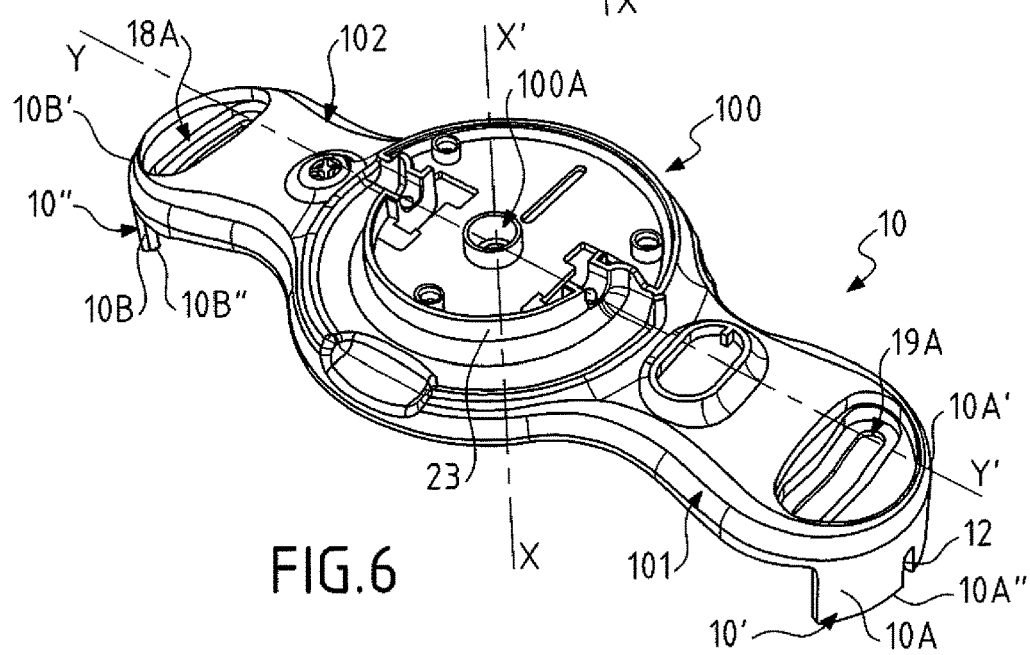
FIG. 6 is a diagrammatic perspective view of a part made of a plastics material and forming the support omitted in FIG. 5.
Figure 10:
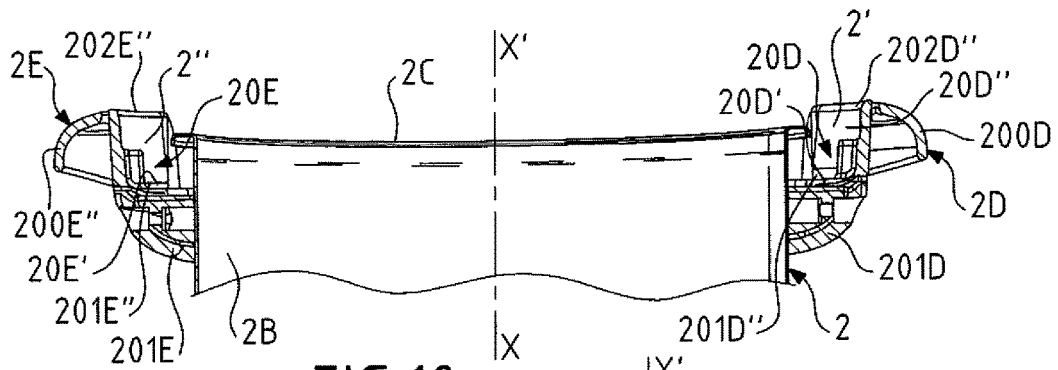
FIG. 10 is a section view of the vessel, showing a detail of the vessel of FIG. 2.
Figure 11:
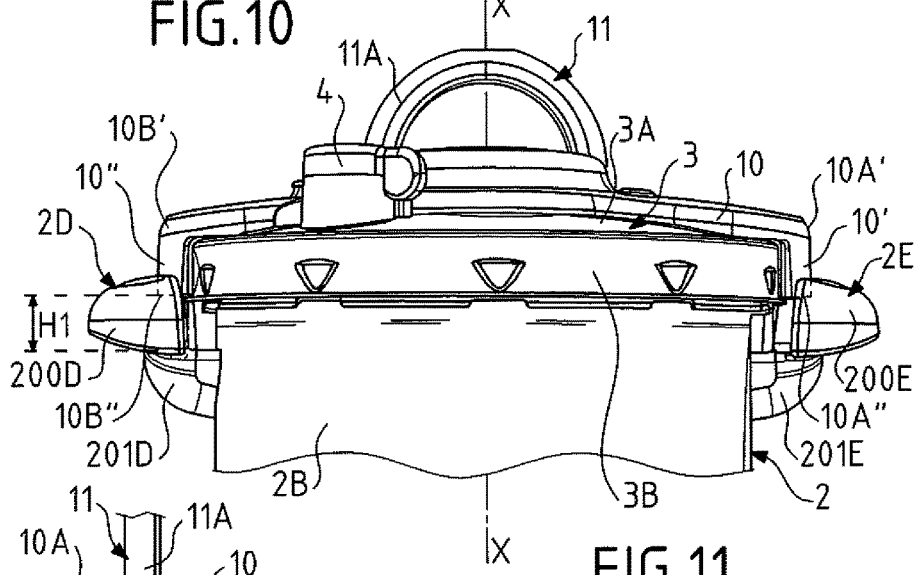
FIG. 11 is a perspective fragmentary view of the utensil of the preceding figures, the lid subassembly and the vessel being associated with each other in the first arrangement, corresponding to a pre-docking configuration of the utensil.
Figure 12:
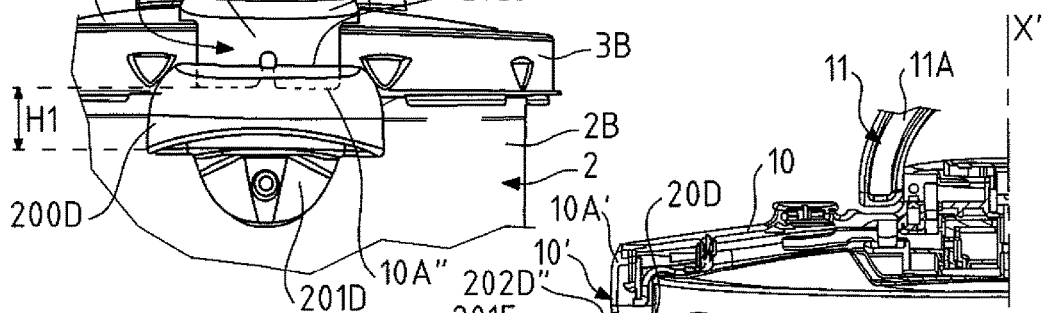
FIG. 12 is a fragmentary perspective side view of the utensil of FIG. 11.
Figure 13:
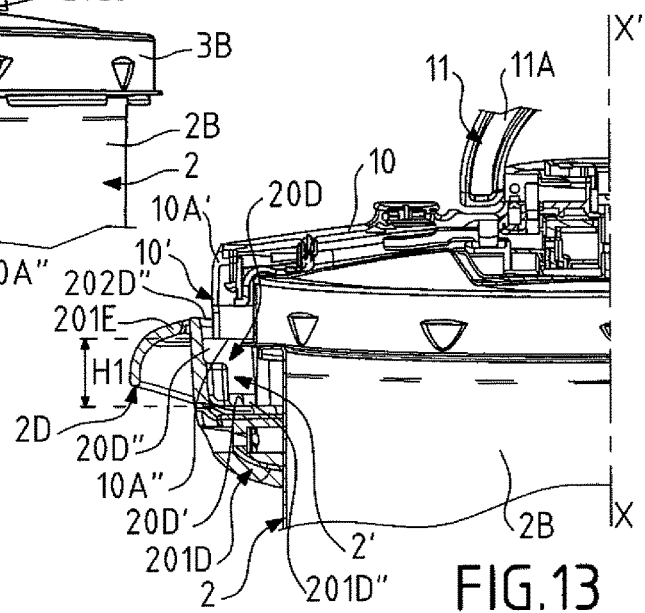
FIG. 13 is a section view of a detail embodiment of the utensil of FIGS. 11 and 12.

Preferably, the second guide element 2', 2" is carried by said vessel handle 2D, 2E. In the embodiment shown in the figures, the vessel 2 is provided with two guide elements 2', 2" disposed diametrically opposite each other about the central vertical axis X-X'. Said second guide elements 2', 2" thus form two female shaped portions that are fastened to the outside face of the side wall 2B of the vessel 2 and that are advantageously carried by respective ones of the two vessel handles 2D, 2E, and even more preferably formed directly by said handles. Advantageously, the support 10 projects radially beyond the lid 3 to which it is attached, so as to form said first guide element 10', 10". In other words, the support 10 extends significantly beyond the periphery of the lid 3 in the radial direction Y-Y', so that said first guide element 10', 10" projects laterally from the lid 3, and thus forms a radial projection at the periphery of the lid 3. Advantageously, the support 10 has a top portion 100, 101, 102 that is mounted above the lid 3, e.g. on and against the outside face of the disk-shaped lid element 3A, and that extends radially beyond said lid to be extended by a vertical dropped edge 10A, 10B that carries said first guide element 10', 10", and that, even more preferably, forms said male shaped portion of said guide element 10', 10" in question. In this example, said dropped edge 10A, 10B extends locally facing the annular band 3B, substantially parallel to it. The vertical dropped edge 10A, 10B advantageously has a dished shape so as locally to match the circular outline of the annular band 3B. This dished profile of the vertical dropped edge 10A, 10B defines a convex outside face that forms the male shaped portion of the first guide element 10', 10". For example, in the embodiment shown in the figures, the support 10 is in the form of a crosspiece, i.e. in the form of a substantially elongate part that extends diametrically over the lid 3 and that is extended, in this example, at each of its ends by a respective dropped edge 10A, 10B, each of which forms a respective one of the two first guide elements 10', 10" disposed diametrically opposite each other about the central vertical axis X-X'. Preferably, the crosspiece in question has a larger central zone 100, e.g. that is circular in general shape, extended on either side by first and second arms 101, 102 that themselves are terminated by respective ones of said dropped edges 10A, 10B. The central portion 100 is advantageously provided with a central orifice inside which a pin 30 fastened to the lid 3 is designed to be inserted, at the center of said lid, about which pin the support 10 is designed to turn about the central vertical axis X-X'. For example, the pin 30 is welded to the lid 3 in such a manner as to extend vertically from the center of said lid, and thus to be capable of being inserted into said orifice 100A. Preferably, the pin 30 is provided with a tapped hollow portion designed to co-operate with a screw 16 in order to fasten the support 10 to the lid 3 while also enabling the lid 3 to pivot about the pin 30. Advantageously, in addition to the part in the form of a crosspiece shown in FIG. 6, the support 10 also includes a plate 17 that is of circular general shape substantially complementary to the shape of the central portion 100 of the crosspiece and that is designed to be interposed between said crosspiece and the top face of the lid 3 to form a housing designed to receive at least in part a control mechanism for causing the lid 3 to pivot relative to the support 10 and that is described in more detail below. For example, in the embodiment shown in the figures, the plate 17 is in the form of a dish made of a plastics material and provided with a central orifice, which is extended via a vertical cylindrical tube in which the pin 30 is designed to be inserted. The crosspiece that can be seen in FIG. 6 is itself designed to be fastened (e.g. by means of a plurality of screws) permanently to the plate 17, in order to co-operate with said plate to form a single-unit, one-piece crosspiece subassembly that is held on the lid 3 by means of the coupling between the pin 30 and the screw 16, which coupling allows the lid 3 to pivot relative to the above-mentioned crosspiece subassembly that, in this example, forms the support 10.

Advantageously, the female shaped portion of the second guide element 2', 2" forms a recess 20D, 20E designed to receive the first guide element 10', 10" gradually as the lid subassembly moves downwards towards the vessel 2 to go from the first arrangement to the second arrangement. Said recess 20D, 20E is advantageously defined by at least a bottom 20D', 20E' that is preferably horizontal, and from which a side wall 20D", 20E" extends vertically between a bottom edge 201D", 201E" and a top edge 202D", 202E". Said recess 20D, 20E is advantageously designed to receive, by downward vertical insertion, said male shaped portion of the first guide element 10', 10", formed, in this example, by the vertical dropped edge 10A, 10B. Said side wall 20D", 20E" of said recess 20D, 20E extends substantially vertically upwards, substantially parallel to the side wall 2B of the vessel 2, and has a profile that is substantially dished in such a manner as so that its concave side faces the side wall 2B of the vessel 2. As described above, the shape of this concave side is substantially complementary to the convex shape of the vertical dropped edge 10A, 10B forming the first guide element 10', 10". Advantageously, said male shaped portion of the first guide element 10', 10" extends vertically between a top edge 10A', 10B' and a bottom edge 10A", 10B" corresponding respectively, in this example, to the high and low ends of the vertical dropped edge 10A, 10B integral with the support 10. Thus, when said lid subassembly and the vessel 2 are associated with each other in said first arrangement, said male shaped portion is inserted in said recess 20D, 20E in such a manner that the bottom edge 10A", 10B" of the male shaped portion is lower than the top edge 202D", 202E" of the side wall 20D", 20E" of said recess 20D, 20E, and is separated vertically from the bottom 20D', 20E' of the recess 20D, 20E by a first height H1.

Advantageously, when said lid subassembly and the vessel 2 are associated with each other in said second arrangement, said male shaped portion is inserted in said recess 20D, 20E in such a manner that the bottom edge 10A", 10B" of the male shaped portion is lower than the top edge 202D", 202E" of said side wall 20D", 20E" of said recess 20D, 20E, and is separated vertically from the bottom 20D', 20E' of the recess 20D, 20E by a second height H2 less than said first height H1. Advantageously, said second height H2 is a non-zero height, i.e. the male shaped portion does not come into contact with the bottom 20D', 20E' when the lid subassembly and the vessel 2 are associated with each other in said second arrangement. Advantageously, said lid subassembly and said vessel 2 are designed so that when they are associated with each other in the second arrangement, the lid subassembly rests and bears directly against the vessel 2 in such a manner as to maintain a vertical spacing (corresponding to the non-zero distance H2) between said first and second guide elements 10', 10", 2', 2" so that said first guide element 10', 10" does not bear vertically against said second guide element 2', 2". The co-operation between said first guide element 10', 10" and said second guide element 2', 2" is thus advantageously positioning and guiding co-operation only, and not supporting co-operation whereby one guide element is supported by the other. Advantageously, said recess 20D, 20E is carried by the vessel handle 2D, 2E and is preferably formed directly by said vessel handle 2D, 2E. In the embodiment shown in the figures, said handle 2D, 2E includes a graspable portion 200D, 200E that is shaped to be capable of being taken hold of manually in order to enable the vessel 2 to be manipulated via it. In other words, said graspable portion 200D, 200E has a shape that makes it appropriate for being grasped by a hand of a user with a view to lifting or transporting the vessel 2. Preferably, said handle 2D, 2E also includes a fastening portion 201D, 201E that interconnects said vessel 2 and said graspable portion 200D, 200E. In the embodiment shown in the figures, the fastening portion 201D, 201E extends radially outwards from the side wall 2B of the vessel 2, and supports the corresponding graspable portion 200D, 200E. Preferably, said recess 20D, 20E is defined (i) vertically by the fastening portion 201D, 201E that advantageously forms the bottom 20D', 20E' of the recess 20D, 20E, and (ii) laterally by the graspable portion 200D, 200E that, in this example, forms said side wall 20D", 20E" of said recess 20D, 20E.

Advantageously, the utensil 1 further includes a first positioning element 12, 13 that is carried by the support 10 and that is designed to interact mechanically with a complementary second positioning element 14, 15 when said lid subassembly and the vessel 2 are associated with each other in said second arrangement, which second positioning element is carried by the vessel 2, and preferably by the vessel handle 2D, 2E, so as to lock the relative angular positioning of the support 10 and of the vessel 2 in a horizontal plane (which, in this example, is perpendicular to said central vertical axis X-X'). This mechanical interaction makes it possible to prevent the support 10 from being capable of pivoting relative to the vessel 2, in this example about said central vertical axis X-X', when the lid subassembly and the vessel 2 are united in said pre-locking second arrangement. This means that the association of the lid subassembly and of the vessel 2 in said second arrangement generates interlocking of the support 10 and of the vessel 2, by co-operation between said first positioning elements 12, 13 and said second positioning elements 14, 15, in order to obtain locking of the relative angular position of the support 10 and of the vessel 2. This angular locking in the horizontal plane enables the support 10 to act as a stationary structure that is stationary relative to the vessel 2 and relative to which the lid 3 can pivot about the central vertical axis X-X' over said predetermined angular stroke (which is, for example, about 15°) so as to go from an unlocked state (shown in FIG. 1) to a locked state (shown in FIG. 16). Advantageously, said mechanical interaction of said first positioning element 12, 13 with said second positioning element 14, 15 is male/female co-operation, based on all or some fraction of a male portion being inserted into a female portion in order to secure the angular locking mechanically. Said male/female co-operation is based, for example, on mutual interfitting engagement of said first and second positioning elements 12, 13, 14, 15. Preferably, in the embodiment shown in the figures, the first and second positioning elements 12, 13, 14, 15 respectively have complementary male and female shaped portions, the first element having the male shaped portion and the second element having the female shaped portion. However, it is quite possible, without going beyond the ambit of the invention, for the first positioning element 12, 13 to have a male shaped portion while the second positioning element 14, 15 has a female shaped portion. In the embodiment shown in the figures, the vessel 2 is provided with two vessel male shaped portions 14, 15 disposed diametrically opposite each other about the central vertical axis X-X' and fastened to the outside face of the side wall 2B of the vessel 2, while the support 10 is provided with two complementary female shaped portions 12, 13 disposed diametrically opposite each other on the lid 3 about the central vertical axis X-X', said support female shaped portions 12, 13 being, in this example, disposed facing the outside face of the annular band 3B of the lid 3. It is however quite possible, without going beyond the ambit of the invention, for said support 10 and said vessel 2 to be provided respectively with a single support shaped portion and with a single vessel shaped portion, or indeed, rather than having male/female shaped portions designed to co-operate by interfitting engagement, for the support 10 and the vessel 2 to be provided with interlocking elements of some other type based on implementing force co-operation (by friction, clipping, meshing, magnetic attraction, etc.) sufficient for locking the relative angular position of the support 10 and of the vessel 2.

Advantageously, and as shown in the figures, said first positioning element 12, 13 is formed by a notch provided in the vertical dropped edge 10A, 10B, while said second positioning element 14, 15 is formed by a rib that is provided in said recess 20D, 20E. Said rib is preferably carried by the handle 2D, 2E, and even more preferably, is an integral part of said handle. Thus, in the embodiment shown in the figures, each vessel handle 2D, 2E is fastened permanently to the side wall 2B of the vessel 2 and incorporates a respective male shaped portion, which, for example, is in the form of a rib that is advantageously formed integrally with the corresponding handle 2D, 2E. Preferably, said rib extends vertically upwards from the bottom 20D', 20E' of the recess 20D, 20E and projects radially inwards from the side wall 20D", 20E", as shown in the figures. As described above, the support 10 is advantageously in the form of a crosspiece that extends over the lid 3 (while being connected to said lid via a pivot coupling) and that is extended at its ends by respective vertical dropped edges 10A, 10B that project radially beyond the lid 3 and extend substantially parallel to the annular band 3B, outside said band. A notch is advantageously provided in the free bottom edge 10A", 10B" of each of said dropped edges 10A, 10B of the support 10 to form a female shaped portion that is complementary to the rib preferably forming the male shaped portion.

Figure 14:
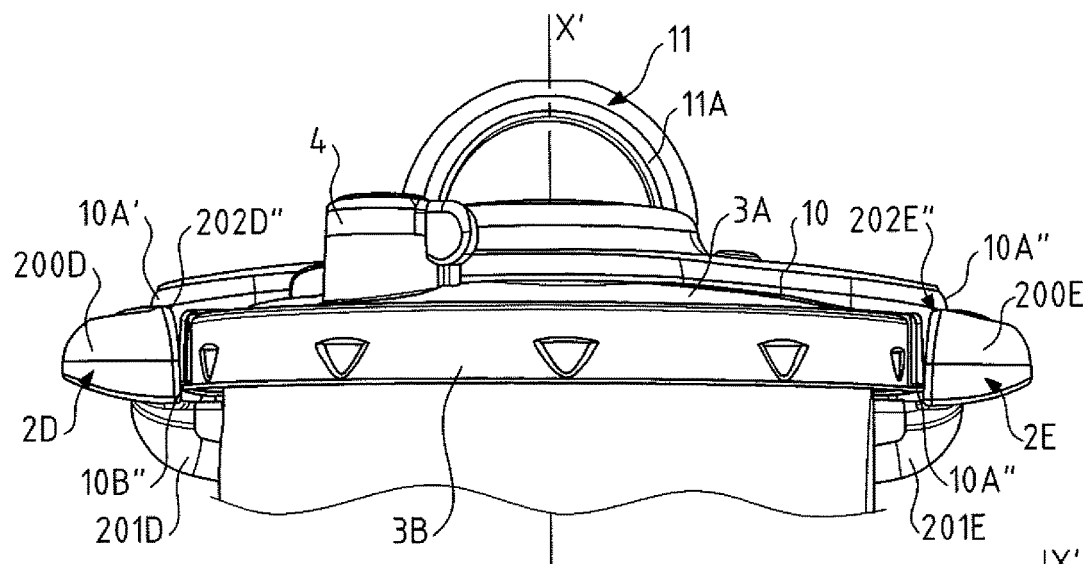
FIG. 14 is a perspective fragmentary side view of the utensil of FIG. 1, the lid subassembly and the vessel being associated with each other in the second arrangement, corresponding to a pre-locking configuration of the utensil.

The utensil 1 also advantageously includes a control member 11 for controlling the bayonet-fitting locking system, which control member is designed, in this example, to be capable of being moved manually relative to the support 10, in such a manner as to enable the user to lock/unlock the lid 3 relative to the vessel 2, i.e. to cause the utensil 1 to go from its pre-locking configuration (also referred to as the "ready-for-locking" configuration—shown in FIG. 1) to its locking configuration (shown in FIG. 16), and vice versa, by turning the lid 3 relative to the support 10 and to the vessel 2. The control member 11 is advantageously carried by the support 10, permanently in this example, so that it is part of said lid subassembly. Advantageously, the control member 11 is mounted on the support 10 in such a manner as to be capable of being moved manually relative to said support between a locking position (FIG. 16) and an unlocking position (FIG. 1). In other words, the control member 11 is advantageously fastened permanently to the support 10 while also retaining the possibility of moving relative to said support, so that a user can manually cause the control member 11 to move relative to the support 10 from the unlocking position to the locking position and vice versa. In addition, the utensil 1 advantageously includes a transformation device for transforming said manual movement of the control member 11 into pivoting of the lid 3 relative to the support 10. The transformation device, which can be seen, in particular, in FIGS. 5, 9, 18, 20, and 21, is thus designed to convert the movement of the control member 11 relative to the support 10 into movement in rotation of the lid 3 relative to said support 10, in this example about said central vertical axis X-X', so that the user can thus cause the locking/unlocking to take place by causing the lid 3 to pivot relative to the support 10 merely by manipulating the control member 11, once the lid subassembly and the vessel 2 are united in said second arrangement (shown in FIGS. 14 to 16, in which the lid ramps are disposed below the vessel ramps). Naturally, the above-mentioned transformation device is designed as a function of the type of movement of the control member 11 relative to the support 10 and can implement any required drive component (toothed wheel, cam, lever, connection rod, etc.). Implementing a control member 11 incorporated in the support 10 and mounted to move relative to said support is however entirely optional. For example, it is quite possible, without going beyond the ambit of the invention, for the control member 11 to be formed merely by a handle fastened directly to the lid 3 and distinct from the support 10, in which case implementing a transformation device is unnecessary. The use of a control member 11 incorporated in the support 10 and mounted to move relative to said support is, however, preferred because it makes the utensil 1 easier to use. In which case, the invention is absolutely not limited to implementing a specific mechanical coupling interconnecting the control member 11 and the support 10. The control member 11 may thus be mounted to pivot and/or to move in translation relative to the support 10 by any appropriate means. For example, the control member 11 may be mounted to move in rotation only, about an axis of rotation that extends in a direction intersecting the direction of the central vertical axis X-X', and even more preferably about an axis of rotation intersecting the central vertical axis X-X', or alternatively, said control member 11 may be mounted to move in translation relative to the support 10, e.g. to slide vertically (preferably along an axis of sliding that coincides with the central vertical axis X-X') relative to said support 10, or indeed be connected to the support 10 via a mechanical coupling combining a movement in translation and a movement in rotation (e.g. a helical coupling of axis X-X'). The control member 11 may thus be in the form of a rotary element of the handle or knob, lever, control stick, looped handle or other type and/or in the form of a slidably mounted element such as a push button, a slider, etc. In the preferred embodiment shown in the figures, the control member 11 is mounted to pivot relative to said support 10 about a radial axis of pivoting Y-Y' that is perpendicular to the central vertical axis X-X', and that preferably intersects said central vertical axis. Advantageously, said transformation device includes a gearing mechanism designed to drive the lid 3 in rotation about said central vertical axis X-X', over a stroke having a first predetermined angular amplitude a, in response to said control member 11 being moved in rotation about said radial axis Y-Y' over a stroke having a second predetermined angular amplitude β that is greater than said first predetermined angular amplitude a. For example, the control member 11 is designed to pivot about said radial axis Y-Y' between a raised position (corresponding to unlocking) and a folded-away position (corresponding to locking) that are separated by a stroke having a predetermined angular amplitude β of about 90°, while, in response to the control member 11 moving relative to the support 10 though an angle of about 90°, the lid 3 pivots relative to the support 10 over a stroke having a predetermined angular amplitude a of about 15°. In the embodiment shown in the figures, the transformation device includes a transmission part 20 mounted to move in translation in a horizontal plane perpendicular to said central vertical axis X-X' relative to said support 10. The transmission part 20 is thus mounted to slide relative to the support 10, e.g. inside the housing provided between the plate 17 and the central portion 100 that fits over said plate 17. In this embodiment, the transformation device comprises a mechanism for transforming the pivoting movement of the control member 11 relative to the support 10 into a movement in translation of said transformation part 20 relative to said support 10. For example, the transformation mechanism in question is formed by a cam 110, 111 integral with or secured to the control member 11, said cam 110, 111 being provided with a stud that is received in a corresponding recess provided in the transmission part 20, in such a manner that pivoting of the control member 11 causes concomitant pivoting of the cam 110, 111, which then pushes back the transmission part 20 in the horizontal plane perpendicular to the central vertical axis X-X'. Advantageously, and in the embodiment shown in the figures, the transformation device further comprises at least one horizontal lever 21 mounted to pivot relative to the support 10 about an off-center vertical axis Z-Z' that is stationary relative to said support 10, that is parallel to said central vertical axis X-X', and that is situated at a predetermined distance from said central vertical axis. Preferably, as shown in the figures, said horizontal lever 21 extends longitudinally between a first end 21A hinged to the lid 3 and a second end 21B hinged either to said control member 11 or to a transmission part (such as, for example, the above-mentioned transmission part 20) that is part of the transformation device and that is caused to move relative to the support 10 by the control member 11, e.g. as in the above-described embodiment. Preferably, the horizontal lever 21 is provided with a recess (e.g. formed by a through orifice) designed to receive a pin 22 integral with or secured to the support 10, and, for example, formed integrally with the plate 17, in such a manner as to form a pivot coupling of axis Z-Z' between the horizontal lever 21 and the support 10. Preferably, said horizontal lever 21 is mounted to pivot relative to the support 10 at a pivot point situated between said first end 21A and said second end 21B, so that the off-center vertical axis Z-Z' goes via a zone of the horizontal lever 21 that is situated at some distance both from the first end 21A and from the second end 21B. The hinging of the first end 21A relative to the lid 3 is achieved, for example, by means of a first peg 210A that is integral with or secured to the lid 3, and is, for example welded to the outside face of said lid 3 in such a manner as to extend vertically upwards from said lid. Said peg 210A is advantageously received in a first corresponding groove 211A provided at the first end 21A of the horizontal lever 21, in such a manner that said first peg 210A can both slide and turn in the first groove 211A in question. The transformation device also advantageously includes a second peg 210B that, in this example, is integral with or secured to the transmission part 20 and is incorporated therein. Said second peg 210B is advantageously received in a complementary second groove 211B provided at the second end 21B of the horizontal lever 21, in such a manner that said second peg 210B can both slide and pivot in the second groove 211B in question. Advantageously, the horizontal lever 21 is generally sickle-shaped, with a substantially rectilinear arm that extends from the first end 21A to the point of rotation through which the off-center vertical axis Z-Z' passes, so as then to be extended by an arcuate portion to the second end 21B. The rectilinear movement in translation of the transmission part 20 in the horizontal plane is converted into movement in rotation of the lever 21 about the off-center vertical axis Z-Z', which movement in rotation is itself converted into movement in rotation of the lid 3 relative to the support 10 about the central vertical axis X-X'. However, the invention is absolutely not limited to such a movement transformation mechanism and, for example, it is quite possible, alternatively, to implement a system having a connection rod, a cam, or meshing inter-engagement, or any other known system. Advantageously, and as shown in the figures, the control member 11 comprises a looped handle 11A designed to be actuated manually so as to be movable by hand by a user between two abutment positions, corresponding respectively to locking and to unlocking. In this preferred embodiment, the control member 11 is thus in the form of an arcuate part, in the form of a loop or of an arch, advantageously designed to be suitable for being grasped firmly by a user, preferably using the whole hand to grasp it. The control member 11 is advantageously designed so that it can be moved manually relative to the support 10 both in a locking direction and in an opposite unlocking direction. Advantageously, as shown in the figures, the control member 11 is mounted to pivot relative to said support 10 between firstly a deployed position (FIG. 1) corresponding to the lid 3 being unlocked, and in which said control member 11 projects vertically, in this example in register with the lid 3 and outwardly, and secondly a retracted position, which forms said locking position and in which said control member 11 is lowered towards the lid 3. In its deployed position, the control member 11 advantageously extends in a mean direction that is substantially parallel to said central vertical axis X-X', while, in its retracted position, it extends advantageously in a mean direction that is substantially perpendicular to said central vertical axis X-X', as shown in the figures.

Operation of the cooking utensil 1 shown in the figures is described briefly below. The user firstly fills the vessel 2 shown in FIG. 2 with food for cooking, optionally placing the food some distance from the bottom of the vessel 2 in a cooking basket having gaps in it. The user then takes hold of the lid subassembly shown in FIG. 4 via the looped handle 11A so as to lift said lid subassembly with a view to mounting it on the vessel 2 so as to fit the lid over the top of the vessel to form a sealed cooking enclosure. For this purpose, the user firstly brings the lid subassembly above the vessel 2, in a relative position that corresponds to the first predetermined arrangement shown in FIGS. 11 to 13. In this arrangement, the dished dropped edges 10A, 10B of the support 10 start to be inserted in part into the corresponding recesses 20D, 20E, while the lid 3 is still held manually above the vessel 2 against its own weight. This co-operation of the vertical dropped edges 10A, 10B with the corresponding recesses 20D, 20E provided by the handles 2D, 2E of the vessel 2 makes it possible to position the lid 3 correctly relative to the vessel 2 in the horizontal plane, and to guide the lid 3 on its vertical path relative to the vessel 2 while the user then continues to move the lid subassembly downwards onto the vessel 2 so that it comes to fit over the top of said vessel and thus reaches the pre-locking second arrangement, in which the ribs forming the second positioning elements 14, 15 then come to engage in interfitting manner in the corresponding notches forming the first positioning elements 12, 13, thereby locking the relative angular positioning of the support 10 and of the lid 2 in a horizontal plane perpendicular to the central vertical axis X-X'. The utensil 1 is then in a ready-for-locking configuration, from which it is possible, merely by turning the lid 3 relative to the vessel 2, to lock the lid 3 relative to the vessel 2. For this purpose, the user folds away the looped handle 11A over an angular stroke 13 of about 90°, until it reaches an abutment folded-away position shown, in particular, in FIGS. 16 and 17. This manual movement of the looped handle 11A from its deployed position to its folded-away position concomitantly causes the lid 3 to pivot relative to the support 10 through an angle α of about 15°, thereby enabling the lid ramps 7A-7J to come into correspondence under the vessel ramps 8A-8J in a locking configuration enabling pressure to build up. At the end of the cooking cycle, and once the pressure prevailing inside the enclosure has fallen to a predetermined safety level, the user merely needs to raise the looped handle 11A in order to cause the lid 3 to pivot relative to the support 10 in the opposite direction, thereby disengaging the vessel ramps from the lid ramps, enabling the lid 3 to be separated from the vessel 2.

The invention claimed is:

1. A cooking utensil for cooking food under pressure comprising:
   a vessel;
   a lid;
   a bayonet-fitting locking system comprising a first series and a second series of locking projections integral respectively with the lid and with the vessel;
   a lid subassembly that comprises said lid and a support attached to said lid in such a manner that said lid can pivot relative to said support, said lid subassembly and said vessel being configured to associate with each other in at least a first arrangement in which the lid overlies the vessel so that said first series of projections are significantly higher than said second series of projections, and a second arrangement obtained from said first arrangement by moving said lid subassembly downwards until said first series of projections are significantly lower than said second series of projections, said support and said vessel also being provided respectively with complementary first and second guide elements that are configured to co-operate mutually whenever said lid subassembly and said vessel are associated with each other in said first arrangement in order to guide said lid subassembly as it moves downwards; and
   a first positioning element that is carried by said support and that is configured to interact mechanically with a complementary second positioning element carried by the vessel, when said lid subassembly and said vessel are associated with each other in said second arrangement, so as to lock a relative angular positioning of the support and of the vessel in a horizontal plane.

2. The cooking utensil according to claim 1, wherein said support is attached to said lid such that said lid can pivot relative to said support about a central vertical axis, said downward movement being a movement in translation parallel to said central vertical axis.

3. The cooking utensil according to claim 1, wherein said complementary first and second guide elements are configured to guide said lid subassembly substantially continuously as it moves downwards until said second arrangement is obtained.

4. The cooking utensil according to claim 1, wherein said second arrangement allows the lid to pivot relative to the support to bring said first series of projections under said second series of projections into locking correspondence.

5. The cooking utensil according to claim 1, wherein said support extends radially beyond the lid to form said first guide element.

6. The cooking utensil according to claim 1, wherein said lid comprises:
   a disk-shaped lid element; and
   an annular band that extends between a first annular edge integral with the disk-shaped lid element and a free second annular edge,
   wherein said vessel being locally surrounded by the free second annular edge when said lid subassembly and said vessel are associated with each other in said second arrangement, while, when said lid subassembly and said vessel are associated with each other in said first arrangement, said free second annular edge is higher than the vessel and does not surround said vessel.

7. The cooking utensil according to claim 6, characterized in that wherein said first series of projections are carried by said annular band.

8. The cooking utensil according to claim 1, wherein said co-operation between said first and second guide elements for guiding said lid subassembly as it moves downwards is co-operation of a male/female type.

9. The cooking utensil according to claim 8, wherein said first and second guide elements respectively have a male shaped portion and a female shaped portion that are complementary to each other.

10. The cooking utensil according to claim 9, wherein said female shaped portion forms a recess defined by at least a bottom from which a side wall extends vertically between a bottom edge and a top edge, said recess being configured to receive said male shaped portion by downward vertical insertion.

11. The cooking utensil according to claim 9, wherein said male shaped portion extends vertically between a top edge and a bottom edge.

12. The cooking utensil according to claim 10, wherein when said lid subassembly and said vessel are associated with each other in said first arrangement, said male shaped portion is inserted into said recess in such a manner that the bottom edge of the male shaped portion is lower than the top edge of said side wall of said recess and is separated vertically from the bottom of the recess by a first height.

13. The cooking utensil according to claim 12, wherein, when said lid subassembly and said vessel are associated with each other in said second arrangement, said male shaped portion is inserted in said recess such that the bottom edge of the male shaped portion is lower than the top edge of said side wall of said recess and is separated vertically from the bottom by a second height less than said first height.

14. The cooking utensil according to claim 11, wherein said support comprises a top portion that is mounted above the lid and that extends radially beyond said lid so as to be extended by a vertical dropped edge that forms said male shaped portion.

15. The cooking utensil according to claim 10, wherein said first positioning element is formed by a notch provided in said vertical dropped edge, while said second positioning element is formed by a rib provided in the recess.

16. The cooking utensil according to claim 1, wherein said vessel is provided with a handle that carries said second guide element.

17. The cooking utensil according to claim 16, wherein said handle has a graspable portion that is shaped to be capable of being taken hold of manually in order to enable the vessel to be manipulated via it, and a fastening portion that interconnects said vessel and said graspable portion.

18. The cooking utensil according to claim 10, wherein said side wall of said recess is formed by said graspable portion.

19. The cooking utensil according to claim 1, wherein said lid subassembly comprises a sealing gasket carried by the lid and configured to be interposed between the lid and the vessel, said lid subassembly and said vessel being configured so that, when said lid subassembly and said vessel are associated with each other in said second arrangement, said lid subassembly rests and bears directly against the vessel in such a manner as to maintain a vertical spacing between said first and second guide elements, so that said first guide element does not bear vertically on said second guide element.

20. The cooking utensil according to claim 1, further comprising:
- a control member for controlling the bayonet-fitting locking system, which control member is configured to be capable of being moved manually relative to the support; and,
- a transformation device for transforming said manual movement of the control member into pivoting of the lid relative to the support.

21. The cooking utensil according to claim 20, wherein said control member is mounted to pivot relative to said support about a radial axis of pivoting that is perpendicular to said central vertical axis.

22. The cooking utensil according to claim 1, wherein the cooking utensil is configured to be subjected to an external heat source.

* * * * *